(12) United States Patent
Katsube et al.

(10) Patent No.: US 11,456,675 B2
(45) Date of Patent: Sep. 27, 2022

(54) FILTER DEVICE AND POWER CONVERTER

(71) Applicant: Hitachi Automotive Systems, Ltd., Hitachinaka (JP)

(72) Inventors: Yusaku Katsube, Hitachinaka (JP); Hiroki Funato, Tokyo (JP); Isao Hoda, Tokyo (JP); Aya Ohmae, Tokyo (JP); Fusanori Nishikimi, Hitachinaka (JP); Yutaka Okubo, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 17 days.

(21) Appl. No.: 17/274,743

(22) PCT Filed: Aug. 6, 2019

(86) PCT No.: PCT/JP2019/030825
§ 371 (c)(1),
(2) Date: Mar. 9, 2021

(87) PCT Pub. No.: WO2020/059337
PCT Pub. Date: Mar. 26, 2020

(65) Prior Publication Data
US 2022/0052616 A1 Feb. 17, 2022

(30) Foreign Application Priority Data
Sep. 19, 2018 (JP) .............................. JP2018-175222

(51) Int. Cl.
*H02M 1/14* (2006.01)
*H02M 7/00* (2006.01)
*H02M 1/44* (2007.01)

(52) U.S. Cl.
CPC ............. *H02M 7/003* (2013.01); *H02M 1/14* (2013.01); *H02M 1/44* (2013.01)

(58) Field of Classification Search
CPC .......... H02M 1/44; H02M 1/14; H02M 7/003; H02M 7/48; H02M 7/42; H02M 7/4803;
(Continued)

(56) References Cited

U.S. PATENT DOCUMENTS 9,912,146 B1 * 3/2018 Wang .................. H02M 7/5383
10,177,674 B2 * 1/2019 Kamikura ............... H02M 1/44
(Continued)

FOREIGN PATENT DOCUMENTS

JP 2-104734 U 8/1990
JP 2004-364080 A 12/2004
(Continued)

OTHER PUBLICATIONS

Lihong Xie; Xinbo Ruan; Qing Ji; Zhihong Ye; "Shielding-cancellation technique for suppressing common mode EMI in isolated power converters"; Nov. 13, 2014; IEEE; 2014 IEEE Energy Conversion Congress and Exposition (ECCE); pp. 4769-4776 (Year: 2014).*

(Continued)

*Primary Examiner* — Thienvu V Tran
*Assistant Examiner* — Shahzeb K Ahmad
(74) *Attorney, Agent, or Firm* — Crowell & Moring LLP (57) ABSTRACT

Since inductance due to wiring to a Y capacitor is large, it is necessary to arrange the Y capacitor near a bus bar, and there is no degree of freedom in arranging the Y capacitor. Directions of currents flowing through a positive electrode side wiring 301 and a negative electrode side wiring 302 in a multi-core cable 300 are a direction 301*a* from a bus bar positive electrode terminal 114 toward the Y capacitor positive electrode terminal 201, and a direction 302*b* from a bus bar negative electrode terminal 115 toward the Y capacitor negative electrode terminal 202, respectively. On the other hand, a direction of a current flowing through a ground (Continued)

wiring 303 is a direction 302b from a Y capacitor ground terminal 203 toward a ground terminal 116. A magnetic flux generated by the currents flowing through the positive electrode side wiring 301 and the negative electrode side wiring 302 in the multi-core cable 300 and a magnetic flux generated by the current flowing through the ground wiring 303 in the multi-core cable 300 cancel each other out, and the inductance can be kept small.

7 Claims, 7 Drawing Sheets

(58) Field of Classification Search
CPC ......... H02M 7/483; H02G 3/16; H03H 1/007; H03H 2001/0014; H03H 7/09; H01R 13/719
See application file for complete search history.

(56) References Cited

U.S. PATENT DOCUMENTS

| | | | | |
|---|---|---|---|---|
| 11,211,912 | B2* | 12/2021 | Yamakaji | ............... H02M 1/44 |
| 2004/0257841 | A1* | 12/2004 | Taguchi | ............... H02M 7/003 363/40 |
| 2012/0262833 | A1 | 10/2012 | Kishimoto et al. | |
| 2016/0182001 | A1 | 6/2016 | Zeng et al. | |
| 2020/0052581 | A1* | 2/2020 | Rosén | ....................... B25F 5/00 |
| 2022/0060162 | A1* | 2/2022 | Hirose | ................ H03H 7/0153 |

FOREIGN PATENT DOCUMENTS

| | | |
|---|---|---|
| JP | 2005-12908 A | 1/2005 |
| JP | 2012-223067 A | 11/2012 |
| JP | 2016-119662 A | 6/2016 |

OTHER PUBLICATIONS

International Search Report (PCT/ISA/210) issued in PCT Application No. PCT/JP2019/030825 dated Nov. 26, 2019 with English translation (five (5) pages).

Japanese-language Written Opinion (PCT/ISA/237) issued in PCT Application No. PCT/JP2019/030825 dated Nov. 26, 2019 (three (3) pages).

* cited by examiner

FILTER DEVICE AND POWER CONVERTER

TECHNICAL FIELD

The present invention relates to a filter device and a power converter.

BACKGROUND ART

A filter device is incorporated for the purpose of removing noise from a power converter.

As the filter device, for example, a Y capacitor is used that is grounded to the ground from a bus bar connected to an inverter in the power converter via a capacitor.

In order for the Y capacitor to function up to a radio frequency, it is necessary to minimize inductance due to wiring from the bus bar up to the Y capacitor, and the Y capacitor is placed close to the bus bar. In PTL 1, a pair of bus bars extending in parallel is grounded via a pair of capacitors, and the capacitors are provided in positions close to the pair of bus bars and sandwiching the bus bars.

CITATION LIST

Patent Literature

PTL 1: JP 2005-012908 A

SUMMARY OF INVENTION

Technical Problem

In the technique described in PTL 1, since the inductance due to the wiring to the Y capacitor is large, it is necessary to arrange the Y capacitor near the bus bar, and there is no degree of freedom in arranging the Y capacitor. For example, since a large current flows through the bus bar to generate heat, it is necessary to add a heat radiator when the Y capacitor is arranged near the bus bar, which increases the size of the entire device and increases the cost.

Solution to Problem

The filter device according to the present invention includes: a Y capacitor; a positive electrode side wiring that connects a positive electrode terminal of the Y capacitor to a positive electrode bus bar; a negative electrode side wiring that connects a negative electrode terminal of the Y capacitor to a negative electrode bus bar; a ground wiring that connects a ground terminal of the Y capacitor to a ground connection portion arranged near the positive electrode bus bar and the negative electrode bus bar; and a cable bundling the positive electrode side wiring, the negative electrode side wiring, and the ground wiring, in which the Y capacitor is connected to the ground connection portion, the positive electrode bus bar, and the negative electrode bus bar via the cable.

The filter device according to the present invention includes: a Y capacitor; a positive electrode side wiring that connects a positive electrode terminal of the Y capacitor to a bus bar positive electrode connection portion of a positive electrode bus bar; a negative electrode side wiring that connects a negative electrode terminal of the Y capacitor to a bus bar negative electrode connection portion of a negative electrode bus bar; and a ground wiring that connects a ground terminal of the Y capacitor to a ground connection portion connected to a housing that houses the filter device, in which the bus bar positive electrode connection portion, the bus bar negative electrode connection portion, and the ground connection portion are arranged near the positive electrode bus bar and the negative electrode bus bar, and the Y capacitor is connected to the bus bar positive electrode connection portion, the bus bar negative electrode connection portion, and the ground connection portion via a cable bundling the positive electrode side wiring, the negative electrode side wiring, and the ground wiring.

The power converter according to the present invention is a power converter including a filter device, and includes a circuit board on which a control circuit used in the power converter and the Y capacitor are mounted.

Advantageous Effects of Invention

According to the present invention, inductance due to wiring to a Y capacitor can be reduced, a degree of freedom in arranging the Y capacitor is increased, and it is unnecessary to arrange the Y capacitor near a bus bar.

DESCRIPTION OF EMBODIMENTS

First Embodiment

Figure 1:
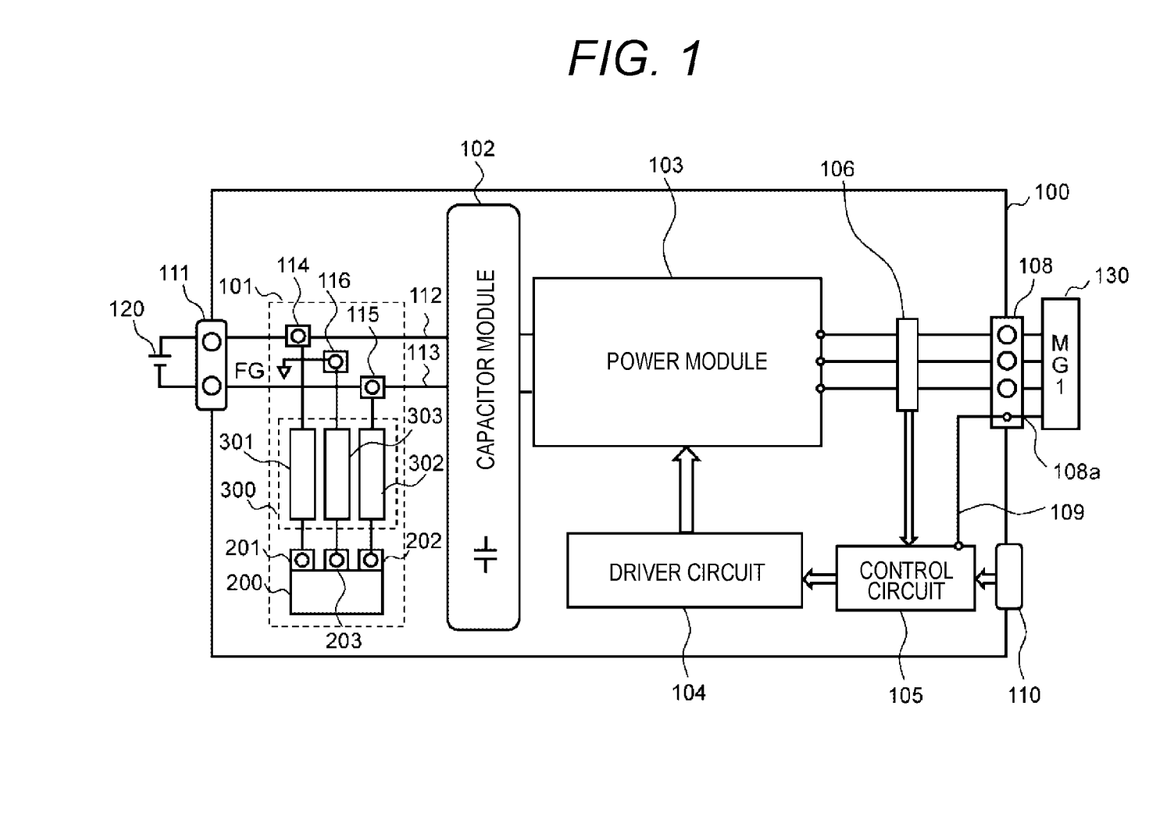
FIG. 1 is a configuration diagram of a power converter.

FIG. 1 is a configuration diagram of a power converter 100.

The power converter 100 includes a filter device 101, a capacitor module 102, a power module 103, a driver circuit 104, a control circuit 105, and a current sensor 106.

A battery 120 supplies a direct current to the power converter 100 by storing an electrical energy required for a vehicle to travel. A direct current (DC) connector 111 is a connector used to input the direct current of the battery 120 to the power converter 100.

The direct current supplied from the battery 120 is converted into a three-phase alternating current by the power converter 100, and a motor generator 130 is driven by the three-phase alternating current output from an alternating current terminal 108. A rotation angle signal of the motor generator 130 is input to the control circuit 105 via a signal line 109. Further, a current value flowing through the three-phase alternating current detected by the current sensor 106 is input to the control circuit 105.

Further, a drive command or the like is input to the control circuit 105 from a control device, which is not shown, via a control connector 110.

The control circuit 105 processes the input command and the like and transmits a drive signal to the driver circuit 104. The driver circuit 104 drives the power module 103 configured by an inverter circuit based on the drive signal from the control circuit 105.

The capacitor module 102 stably supplies the direct current to the power module 103 by smoothing the direct current from the battery 120.

A positive electrode bus bar 112 connects the DC connector 111 to the capacitor module 102. A negative electrode bus bar 113 connects the DC connector 111 to the capacitor module 102.

The filter device 101 includes a Y capacitor 200 and a multi-core cable 300. The Y capacitor 200 is connected to the positive electrode bus bar 112 and the negative electrode bus bar 113 via the multi-core cable 300.

The multi-core cable 300 includes a positive electrode side wiring 301, a negative electrode side wiring 302, and a ground wiring 303.

The Y capacitor 200 has a Y capacitor positive electrode terminal 201, a Y capacitor negative electrode terminal 202, and a Y capacitor ground terminal 203. The Y capacitor 200 is provided to prevent noise generated by the power converter 100 from being output from the DC connector 111.

A bus bar positive electrode terminal 114, a bus bar negative electrode terminal 115, and a ground terminal 116 are arranged in the vicinity of the positive electrode bus bar 112 and the negative electrode bus bar 113. The Y capacitor positive electrode terminal 201 is connected to the bus bar positive electrode terminal 114 via the positive electrode side wiring 301 of the multi-core cable 300. The Y capacitor negative electrode terminal 202 is connected to the bus bar negative electrode terminal 115 via the negative electrode side wiring 302 of the multi-core cable 300. The Y capacitor ground terminal 203 is connected to the ground terminal 116 via the ground wiring 303 of the multi-core cable 300. The ground terminal 116 is connected to a frame ground FG, which is a metal housing of the power converter 100.

Figure 2:
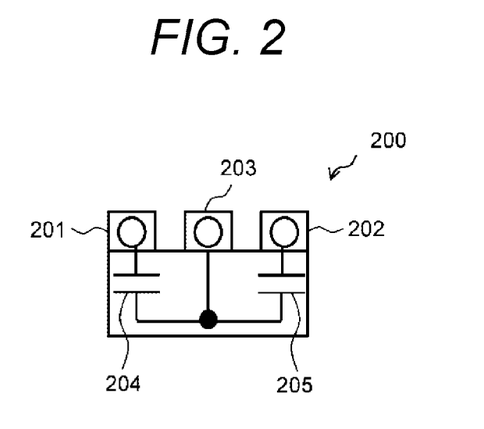
FIG. 2 is a diagram illustrating a configuration of a Y capacitor.

FIG. 2 is a diagram illustrating a configuration of the Y capacitor 200.

The Y capacitor 200 is composed of the Y capacitor positive electrode terminal 201, the Y capacitor negative electrode terminal 202, the Y capacitor ground terminal 203, a positive electrode side capacitor 204, and a negative electrode side capacitor 205. One end of the positive electrode side capacitor 204 is connected to the Y capacitor positive electrode terminal 201, and another end is connected to the Y capacitor ground terminal 203. One end of the negative electrode side capacitor 205 is connected to the Y capacitor negative electrode terminal 202, and another end is connected to the Y capacitor ground terminal 203. Common mode noise currents input to the Y capacitor positive electrode terminal 201 and the Y capacitor negative electrode terminal 202 are bypassed to the Y capacitor ground terminal 203 to reduce a noise output from the DC connector 111.

Figure 3:
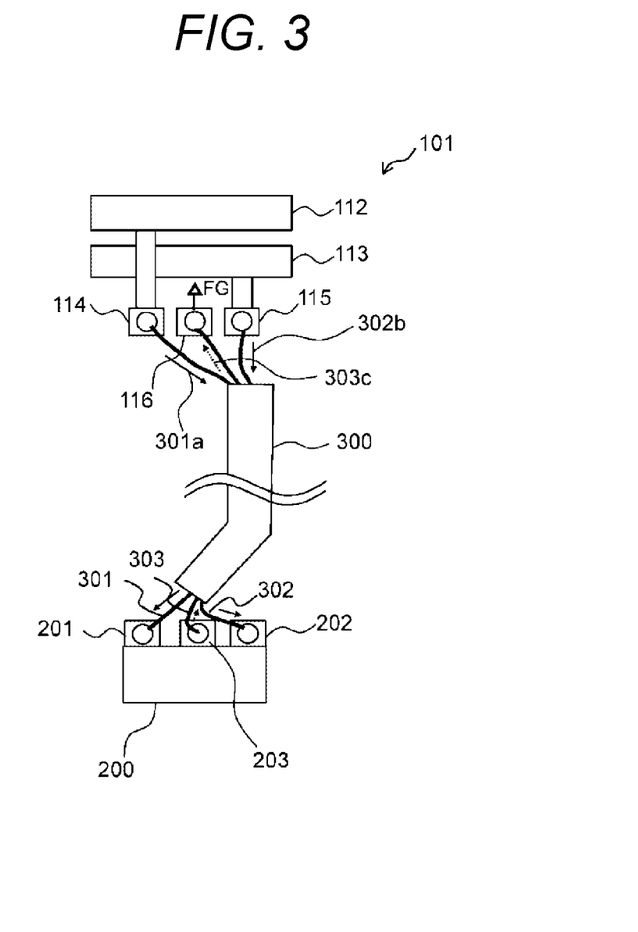
FIG. 3 is a diagram illustrating a configuration of a filter device.

FIG. 3 is a diagram illustrating a configuration of the filter device 101. A state is shown where the Y capacitor 200 is connected to the positive electrode bus bar 112 and the negative electrode bus bar 113 via the multi-core cable 300.

The multi-core cable 300 is configured by bundling the positive electrode side wiring 301, the negative electrode side wiring 302, and the ground wiring 303 and covering them with a covering member. The positive electrode side wiring 301, the negative electrode side wiring 302, and the ground wiring 303 of the multi-core cable 300 are fixed to the Y capacitor positive electrode terminal 201, the Y capacitor negative electrode terminal 202, and the Y capacitor ground terminal 203 of the Y capacitor 200 by screwing, respectively. Similarly, the positive electrode side wiring 301, the negative electrode side wiring 302, and the ground w wiring 303 of the multi-core cable 300 are fixed to the bus bar positive electrode terminal 114, the bus bar negative electrode terminal 115, and the ground terminal 116 by screwing, respectively. Further, the ground terminal 116 is arranged so as to be located between the bus bar positive electrode terminal 114 and the bus bar negative electrode terminal 115. Then, the ground terminal 116 is connected to the frame ground FG, which is the metal housing of the power converter 100. That is, the positive electrode side wiring 301 and the ground wiring 303 are brought close to each other, and the negative electrode side wiring 302 and the ground wiring 303 are brought close to each other. As a result, as described later, currents flowing through the positive electrode side wiring 301 and the negative electrode side wiring 302 and a current flowing through the ground wiring 303 are opposite to each other, so that magnetic fluxes generated by the currents cancel each other out and the inductance can be kept small.

When the direction of the current flowing through the ground terminal is positive with respect to the bus bar positive electrode terminal 114 and the bus bar negative electrode terminal 115, directions of the currents flowing through the positive electrode side wiring 301 and the negative electrode side wiring 302 in the multi-core cable 300 are a direction 301a from the bus bar positive electrode terminal 114 toward the Y capacitor positive electrode terminal 201, and a direction 302b from the bus bar negative electrode terminal 115 toward the Y capacitor negative electrode terminal 202, respectively. On the other hand, a direction of the current flowing through the ground wiring 303 in the multi-core cable 300 is a direction 303c from the Y capacitor ground terminal 203 to the ground terminal 116.

Figure 4:
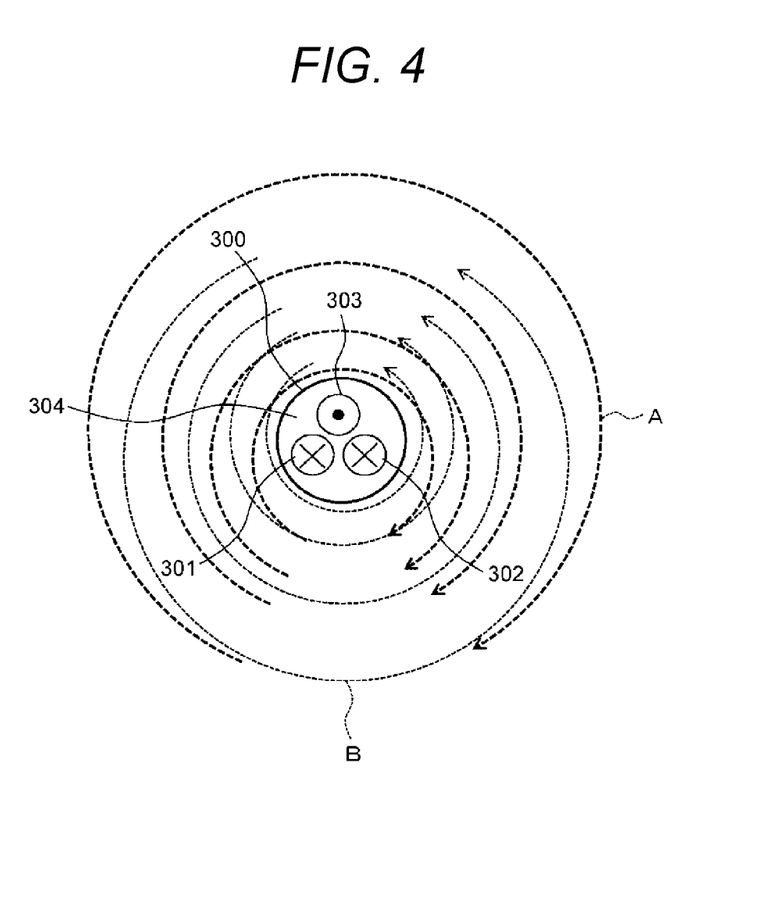
FIG. 4 is a cross-sectional view of a multi-core cable.

FIG. 4 is a cross-sectional view of the multi-core cable 300. A magnetic flux A generated by the currents flowing through the positive electrode side wiring 301 and the negative electrode side wiring 302 in the multi-core cable 300 and a magnetic flux B generated by the current flowing through the ground wiring 303 in the multi-core cable 300 cancel each other out to keep the inductance small. Therefore, the low inductance can be maintained even if the multi-core cable 300 is lengthened, and radio frequency performance of the Y capacitor 200 can be maintained. Moreover, since the Y capacitor 200 can be connected to the bus bars via the flexible multi-core cable 300, the degree of freedom in arranging the Y capacitor 200 can be increased.

Figure 5:
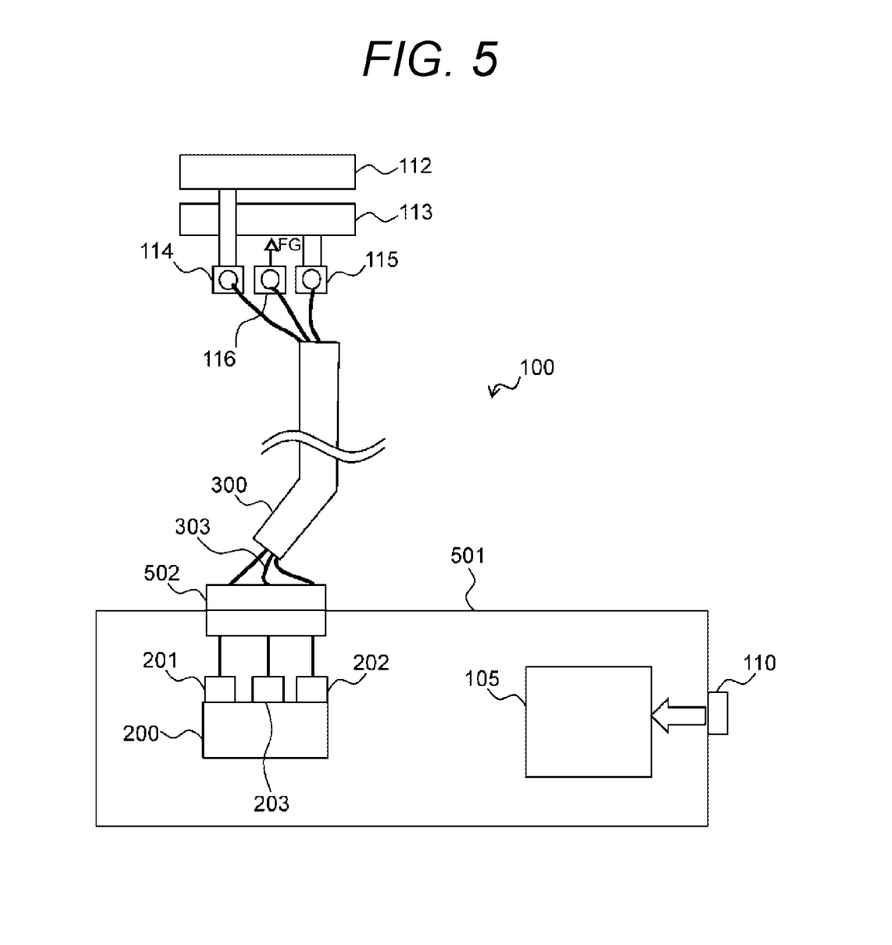
FIG. 5 is a diagram showing an example of a power converter on which a Y capacitor is mounted.

FIG. 5 is a diagram showing an example of the power converter 100 on which the Y capacitor 200 is mounted.

A control board 501 is a board on which the control circuit 105 is mounted. A drive command or the like is input to the control circuit 105 from a control device, which is not shown, via the control connector 110. Further, the Y capacitor 200 is mounted on the control board 501. The Y capacitor 200 is connected to the bus bar positive electrode terminal 114, the bus bar negative electrode terminal 115, and the ground terminal 116 via a connector 502 and the multi-core cable 300. The ground terminal 116 is connected to a frame ground FG, which is a metal housing of the power converter 100. In this way, the Y capacitor 200 is arranged away from the positive electrode bus bar 112 and the negative electrode bus bar 113 so as not to be affected by heat of the positive electrode bus bar 112 and the negative electrode bus bar 113.

In the control board 501, ground wiring of the control board 501 and the ground terminal 203 of the Y capacitor 200 are configured so as not to be connected on the control board 501. In other words, the ground wiring 303 of the multi-core cable 300 is configured so as not to be connected to or contact the ground wiring of the control board 501. With this configuration, the current flowing through the ground wiring 303 of the multi-core cable 300 does not flow on the control board 501, but flows through the multi-core cable 300 to the ground terminal 116. By this current flow, the effect of canceling the magnetic flux is exhibited, the Y capacitor 200 can be connected without increasing the inductance, and the radio frequency performance can be maintained. In addition, a mounting component on the control board 501 can be used as the Y capacitor 200, and the mounting area can be reduced.

A covering member 304 of the multi-core cable 300 has a function of bundling the positive electrode side wiring 301, the negative electrode side wiring 302, and the ground wiring 303, but is not limited to this configuration. For example, the positive electrode side wiring 301, the negative electrode side wiring 302, and the ground wiring 303 can be bundled by being passed through a tube, the positive electrode side wiring 301, the negative electrode side wiring 302, and the ground wiring 303 can be bundled by being wound together with tape, and the positive electrode side wiring 301, the negative electrode side wiring 302, and the ground wiring 303 can be bundled by being mutually twisted, or by being inserted into a metal or resin guide or hole, or can be bundled by a plurality of binding bands or adhesives. Further, as the positive electrode side wiring 301, the negative electrode side wiring 302, and the ground wiring 303 are brought into closer contact with each other, the effect of canceling the magnetic flux more increases.

Figure 6:
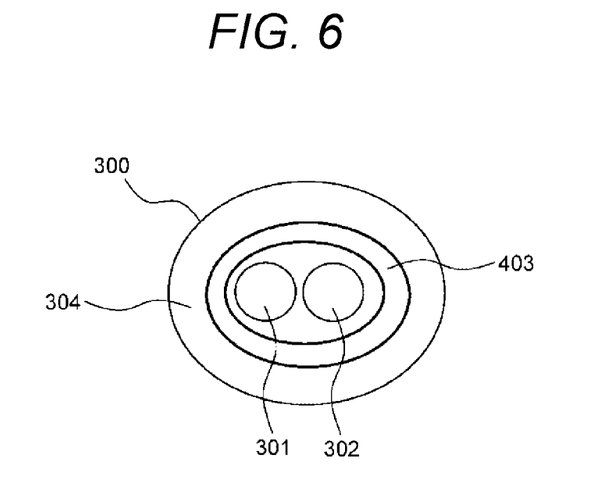
FIG. 6 is a cross-sectional view showing another example of a multi-core cable.

FIG. 6 is a cross-sectional view showing another example of the multi-core cable 300, which can enhance the effect of canceling the magnetic flux.

The multi-core cable 300 includes the positive electrode side wiring 301, the negative electrode side wiring 302, a conductive shield layer 403 surrounding the positive electrode side wiring 301 and the negative electrode side wiring 302, and the covering member 304. The shield layer 403 constitutes the ground wiring 303, and connects the ground terminal 116 to the Y capacitor ground terminal 203. In this way, even if the ground wiring 303 is replaced with the shield layer 403, the directions of the currents flowing through the positive electrode side wiring 301 and the negative electrode side wiring 302, and through the shield layer 403 are opposite to each other, so that the magnetic fluxes cancel each other out and the inductance can be kept small. In this example, about half of surfaces of the positive electrode side wiring 301 and the negative electrode side wiring 302 are in close contact with the shield layer 403, so that the effect of canceling the magnetic flux is increased as compared with the case where the shield layer 403 is not used. Further, since the shield layer 403 covers the positive electrode side wiring 301 and the negative electrode side wiring 302, it is possible to prevent noise radiation due to an electric field generated inside the shield layer 403. Although an example in which the shield layer 403 is used as the ground wiring 303 has been described, a plurality of the ground wirings 303 may be used instead of the shield layer 403 and covered with the covering member 304 together with the positive electrode side wiring 301 and the negative electrode side wiring 302 so as to form the multi-core cable 300.

Figure 7A:
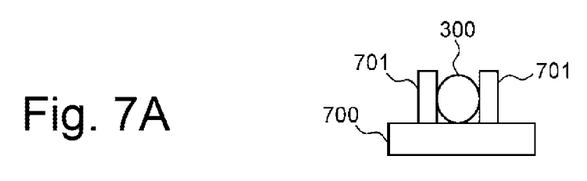
FIGS. 7A and 7B are diagrams showing an example of how a multi-core cable is fixed.
Figure 7B:
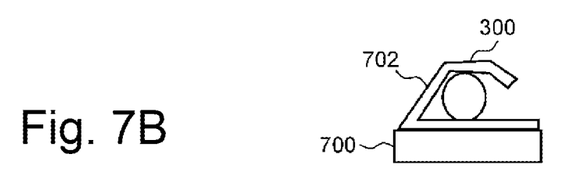

FIG. 7 is a diagram showing an example of how the multi-core cable 300 is fixed.

FIG. 7(A) shows an example in which the multi-core cable 300 is sandwiched and fixed between two fixing portions 701 protruding from an inner wall of a metal housing 700 of the power converter 100. FIG. 7(B) shows an example in which the multi-core cable 300 is sandwiched by and fixed to a U-shaped clip 702 provided on the inner wall of the metal housing 700 of the power converter 100. The multi-core cable 300 conducts heat from the bus bar positive electrode terminal 114 and the bus bar negative electrode terminal 115. As shown in FIGS. 7(A) and 7(B), the heat transferred to the multi-core cable 300 can be dissipated to the metal housing 700 by bringing the multi-core cable 300 into close contact with the inner wall of the metal housing 700.

Therefore, it is possible to prevent the performance of the multi-core cable 300 and the Y capacitor 200 connected to the multi-core cable 300 from deteriorating due to heat from the bus bars. Although the example has been described in which the fixing portions 701 and the clip 702 protrude from the metal housing 700 of the power converter 100, the metal housing 700 only has to be at least a housing that houses the filter device 101.

Next, a series resonance frequency of the filter device 101 will be described. The series resonance frequency of the filter device 101 is preferably 1.8 MHz or less. The directions of the currents flowing through the positive electrode side wiring 301 and the negative electrode side wiring 302 in the multi-core cable 300 are opposite to the direction of the current flowing through the ground wiring 303, and the magnetic fluxes cancel each other out. Accordingly, the series resonance frequency is not easily affected by bending of the multi-core cable 300 and metal such as the metal housing 700. Therefore, the multi-core cable 300 can be freely installed at an arbitrary position, and the series resonance frequency of the filter device 101 can be adjusted by a length of the multi-core cable 300. For example, a medium wave (MW) band (0.53 MHz to 1.8 MHz specified by CISPR25 ("Radio disturbance characteristics for the protection of receivers used on board vehicles, boats, and on devices-Limits and methods of measurement") used in amplitude modulation (AM) radio is a particular problem for in-vehicle devices. Noise in the MW band can be blocked by setting the series resonance frequency to 1.8 MHz or less.

According to this embodiment, a configuration can be made such that the directions of the currents flowing through the positive electrode side wiring 301 and the negative electrode side wiring 302 in the multi-core cable 300 and the direction of the current flowing through the ground wiring in the multi-core cable 300 are opposite to each other. As a result, the effect of canceling the magnetic fluxes generated by the currents each other out is produced, and the inductance becomes small. Therefore, even if the multi-core cable 300 is lengthened, the low inductance can be maintained, the radio frequency performance of the Y capacitor 200 can be maintained, and the degree of freedom in arranging the Y capacitor 200 can be increased.

According to the embodiment described above, the following operational effects can be obtained.

(1) The filter device 101 includes the Y capacitor 200, the positive electrode side wiring 301 that connects the Y capacitor positive electrode terminal 201 of the Y capacitor 200 to the positive electrode bus bar 112, the negative electrode side wiring 302 that connects the Y capacitor negative electrode terminal 202 of the Y capacitor 200 to the negative electrode bus bar 113, the ground wiring 303 that connects the Y capacitor ground terminal 203 of the Y capacitor 200 to the ground terminal 116 arranged in the vicinity of the positive electrode bus bar 112 and the negative electrode bus bar 113, and the multi-core cable 300 bundling the positive electrode side wiring 301, the negative electrode side wiring 302, and the ground wiring 303, in which the Y capacitor 200 is connected to the ground terminal 116, the positive electrode bus bar 112, and the negative electrode bus bar 113 via the multi-core cable 300. As a result, the inductance due to the wiring to the Y capacitor 200 can be reduced, the degree of freedom in arranging the Y capacitor 200 is increased, and it is unnecessary to arrange the Y capacitor 200 near the bus bars.

(2) The filter device 101 includes the Y capacitor 200, the positive electrode side wiring 301 that connects the positive electrode terminal 201 of the Y capacitor 200 to the bus bar positive electrode terminal 114 of the positive electrode bus bar 112, the negative electrode side wiring 302 that connects the negative electrode terminal 202 of the Y capacitor 200 to the bus bar negative electrode terminal 115 of the negative electrode bus bar 113, and the ground wiring 303 that connects the ground terminal 203 of the Y capacitor 200 to the ground terminal 116 connected to the housing that houses the filter device 101, in which the bus bar positive electrode terminal 114, the bus bar negative electrode terminal 115, and the ground terminal 116 are arranged in the vicinity of the positive electrode bus bar 112 and the negative electrode bus bar 113, and the Y capacitor 200 is connected to the bus bar positive electrode terminal 114, the bus bar negative electrode terminal 115, and the ground terminal 116 via the multi-core cable 300 bundling the positive electrode side wiring 301, the negative electrode side wiring 302, and the ground wiring 303.

As a result, the inductance due to the wiring to the Y capacitor 200 can be reduced, the degree of freedom in arranging the Y capacitor 200 is increased, and it is unnecessary to arrange the Y capacitor 200 near the bus bars.

The present invention is not limited to the above-described embodiments, and other forms conceivable within the scope of the technical idea of the present invention are also included in the scope of the present invention as long as the characteristics of the present invention are not impaired.

REFERENCE SIGNS LIST

100 power converter
101 filter device
102 capacitor module
103 power module
104 driver circuit
105 control circuit
106 current sensor
111 DC connector
112 positive electrode bus bar
113 negative electrode bus bar
114 bus bar positive electrode terminal
115 bus bar negative electrode terminal
116 ground terminal
200 Y capacitor
201 Y capacitor positive electrode terminal
202 Y capacitor negative electrode terminal
203 Y capacitor ground terminal
300 multi-core cable
301 positive electrode side wiring
302 negative electrode side wiring
303 ground wiring

The invention claimed is:

1. A filter device comprising:
a Y capacitor;
a positive electrode side wiring that connects a positive electrode terminal of the Y capacitor to a positive electrode bus bar;
a negative electrode side wiring that connects a negative electrode terminal of the Y capacitor to a negative electrode bus bar;
a ground wiring that connects a ground terminal of the Y capacitor to a ground connection portion arranged near the positive electrode bus bar and the negative electrode bus bar; and
a cable bundling the positive electrode side wiring, the negative electrode side wiring, and the ground wiring,
wherein the Y capacitor is connected to the ground connection portion, the positive electrode bus bar, and the negative electrode bus bar via the cable.

2. The filter device according to claim 1, further comprising:
a bus bar positive electrode connection portion that connects the positive electrode side wiring to the positive electrode bus bar; and
a bus bar negative electrode connection portion that connects the negative electrode side wiring to the negative electrode bus bar,
wherein the ground connection portion is arranged between the bus bar positive electrode connection portion and the bus bar negative electrode connection portion.

3. The filter device according to claim 1, wherein
the cable includes a conductive shield layer that surrounds the positive electrode side wiring and the negative electrode side wiring, and
the shield layer constitutes the ground wiring.

4. The filter device according to claim 1, further comprising a housing that houses the filter device,
wherein the ground connection portion is connected to the housing.

5. The filter device according to claim 4, further comprising
a fixing portion that fixes the cable and brings the cable into contact with an inner wall of the housing.

6. A power converter including the filter device according to claim 1, the power converter comprising
a circuit board on which a control circuit used in the power converter and the Y capacitor are mounted.

7. A filter device comprising:
a Y capacitor;
a positive electrode side wiring that connects a positive electrode terminal of the Y capacitor to a bus bar positive electrode connection portion of a positive electrode bus bar;
a negative electrode side wiring that connects a negative electrode terminal of the Y capacitor to a bus bar negative electrode connection portion of a negative electrode bus bar; and
a ground wiring that connects a ground terminal of the Y capacitor to a ground connection portion connected to a housing that houses the filter device,
wherein the bus bar positive electrode connection portion, the bus bar negative electrode connection portion, and the ground connection portion are arranged near the positive electrode bus bar and the negative electrode bus bar, and the Y capacitor is connected to the bus bar positive electrode connection portion, the bus bar negative electrode connection portion, and the ground connection portion via a cable bundling the positive electrode side wiring, the negative electrode side wiring, and the ground wiring.

* * * * *